United States Patent [19]

Slezak

[11] Patent Number: 4,566,854

[45] Date of Patent: Jan. 28, 1986

[54] WIND ROTOR

[76] Inventor: Ray J. Slezak, 1110 - 28th St., West Des Moines, Iowa 50265

[21] Appl. No.: 612,707

[22] Filed: May 21, 1984

[51] Int. Cl.$^4$ .............................................. F03D 7/06
[52] U.S. Cl. ................... 416/119; 416/132 B
[58] Field of Search ............. 416/119, DIG. 8, 132 B

[56] References Cited

U.S. PATENT DOCUMENTS

| | | | |
|---|---|---|---|
| 692,714 | 2/1902 | Sala et al. ......................... | 416/197 A |
| 1,835,018 | 12/1931 | Darrieus ........................... | 416/227 A |
| 3,897,170 | 7/1975 | Darvishian ........................ | 416/119 |
| 3,994,621 | 11/1976 | Bogie ................................ | 415/2 R X |
| 4,015,911 | 4/1977 | Darvishian ........................ | 416/119 |
| 4,245,958 | 1/1981 | Ewers ............................... | 416/197 A |
| 4,299,537 | 11/1981 | Evans ................................ | 416/119 |
| 4,334,823 | 6/1982 | Sharp ................................ | 416/17 X |
| 4,368,392 | 1/1983 | Drees ................................ | 416/119 X |
| 4,410,806 | 10/1983 | Brulle ............................... | 290/44 |
| 4,415,312 | 11/1983 | Brenneman ................. | 416/132 B X |
| 4,430,044 | 2/1984 | Liljegren ...................... | 416/132 B X |
| 4,435,124 | 3/1984 | Zheng ................................ | 416/119 |
| 4,452,568 | 6/1984 | Andersson ........................ | 416/119 |

FOREIGN PATENT DOCUMENTS

| | | | |
|---|---|---|---|
| 2481756 | 11/1981 | France .................................. | 416/17 |
| WO81/21790 | 1/1981 | PCT Int'l Appl. ................. | 416/119 |
| 2040363 | 8/1980 | United Kingdom ........... | 416/132 B |

OTHER PUBLICATIONS

Sandia Laboratories Report by B. F. Blackwell, "The Vertical-Axis Wind Turbine-How it Works".

Primary Examiner—Everette A. Powell, Jr.
Attorney, Agent, or Firm—Zarley, McKee, Thomte, Voorhees & Sease

[57] ABSTRACT

The wind rotor of the present invention includes a vertically disposed, rotatable shaft operatively connected to a conventional generator. A plurality of bent lever arms are uniformly radially attached to the shaft and extend outwardly therefrom. Each arm has a vertically disposed rectilinear airfoil blade connected to the outer end thereof such that the wind generates aerodynamic lifting forces on the blades to cause rotation of the wind rotor. The bent lever arm transmits a greater portion of the lifting forces to the central shaft for increased torque in the wind rotor.

10 Claims, 7 Drawing Figures

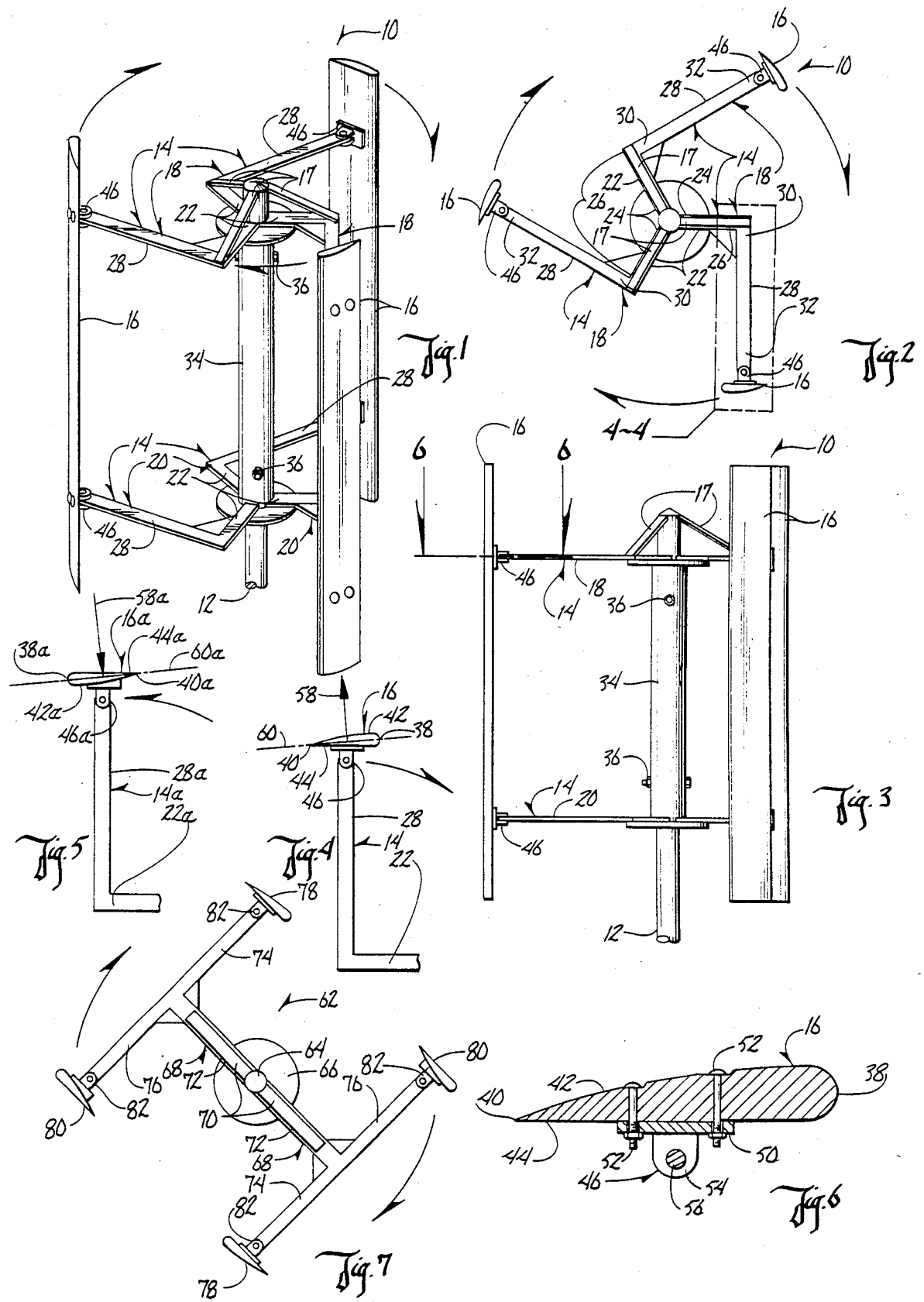

WIND ROTOR

BACKGROUND OF THE INVENTION

Windmills have long been used for generating electricity. Conventional windmills generally take the form of a wind turbine having a plurality of blades or surfaces which are connected to a central shaft by lever arms. The blades serve to catch the wind such that the impingement of the wind upon the blades causes the central shaft to be rotated. By connecting the rotating shaft to a generator, the kinematic energy of the wind is converted to electricity. The angular velocity of such wind turbines are limited by the velocity of the wind.

In contrast to a wind turbine which relies upon the impact of the fluid particles upon the blade surfaces, a wind rotor utilizes aerodynamics resulting from the interaction of the fluid particles with airfoil-shaped blades. As the air particles move with respect to the blades, lifting forces are exerted on the blade. The wind rotor blades are connected to a central shaft by lever arms such that the lift generated on the blade by the moving fluid particles rotates the blades and the central shaft to produce electricity. While the angular velocity of the blades of the wind rotor are not limited by the wind velocity, the torque on the central shaft is limited by the component of the total lift forces which can be transmitted to the central shaft through the lever arms.

Total lift, which is perpendicular to the chord line of the airfoil blade, can be resolved into components which are parallel and non-parallel to the lever arm connecting the blade to the central shaft. In prior art wind rotors, the lever arm is straight and the blade is connected such that the chord line thereof is substantially perpendicular to the lever arm. Thus, in conventional wind rotors, the majority of the total lift acts in a line parallel to the lever arm and generates no torque upon the central shaft. Only a small component of the total lift is utilized in applying torque to the central shaft.

Therefore, a primary objective of the present invention is an improved wind rotor which produces greater torque upon the central shaft and therefore increases the amount of kinematic wind energy that can be converted to dynamic energy.

A further objective of the present invention is the provision of a wind rotor having airfoil blades connected to bent lever arms so as to utilize a greater portion of the total lift produced on the blades by the wind for increased torque upon the central shaft of the rotor.

Another objective of the present invention is the provision of a wind rotor wherein the angle of attack of the blades is selectively adjustable.

A still further objective of the present invention is the provision of a wind rotor which can be selectively rotated in either a clockwise or counter-clockwise direction.

A further objective of the present invention is the provision of a wind rotor which is self-starting.

Another objective of the present invention is the provision of a wind rotor having detachable blades.

Another objective of the present invention is the provision of a wind rotor which is economical to manufacture, and durable and efficient in use.

SUMMARY OF THE INVENTION

The wind rotor of the present invention includes a central shaft connected to a generator. An upper and lower set of uniformly radially spaced, bent lever arms are connected to the central shaft. Rectilinear airfoil blades are connnected to the respective lever arms such that the blades are vertically disposed and parallel to the central shaft. Appropriate bracing is supplied to the arms to maintain the rigidity thereof.

Each arm is comprised of a first and second arm member angularly disposed with respect to one another. The length of the inner arm which is connected to the central shaft influences the magnitude of the torque developed by the wind rotor, while the length of the second arm to which the blades are connected determines the circumferential speed of the blade. The movement of the wind with respect to the blades generates aerodynamic lifting forces on the blades. The component of lift that is perpendicular to the inner arm members produces torque upon the central shaft, pursuant to the law of moments. The magnitude of this component of the total lift is substantially greater than that which can be utilized in a straight arm wind rotor.

The wind rotor of the present invention includes adjustable connection means for connecting the blades to the outer second arm members such that the angle of attack of the blades with respect to the wind is selectively adjustable. Means for applying a rotational counter force are provided such that the rotation of the rotor can be slowed or stopped.

BRIEF DESCRIPTION OF THE DRAWINGS

FIG. 1 is a perspective view of the wind rotor of the present invention.

FIG. 2 is a top plan view of the wind rotor.

FIG. 3 is a side elevational view of the wind rotor.

FIG. 4 is an enlarged view taken along line 4—4 of FIG. 2.

FIG. 5 is a view similar to FIG. 4 showing an alternative arrangement of the blade and arm assembly.

FIG. 6 is a view taken along line 6—6 of FIG. 3 showing the connection between the blade and the lever arm.

FIG. 7 is a top plan view of an alternative embodiment of a wind rotor.

DETAILED DESCRIPTION OF THE DRAWINGS

The reference numeral 10 generally designates the wind rotor of the present invention. Wind rotor 10 comprises a vertically disposed central shaft 12 having a plurality of arms 14 extending outwardly therefrom, and a plurality of rectilinear blades 16 connected to arms 14 so as to be vertically disposed in parallel relation to central shaft 12. Appropriate structural framework (not shown) may be utilized for maintaining shaft 12 in a vertical disposition. Shaft 12 is connected by conventional means at its lower end to a generator (not shown) for the production of electricity upon the rotation of shaft 12 about its longitudinal axis. Structural stability of arms 14 is provided by braces 17 extending from shaft 12 to each of arms 14.

Preferably, wind rotor 10 includes an upper set 18 and lower set 20 of arms 14. Each set 18 and 20 includes an equal number of arms 14, though the number of arms on a particular wind rotor may vary. Arms 14 of each upper and lower set are spaced an equal distance from one another about shaft 12. As an alternative to multiple sets of arms, wind rotor 10 may have a single set of arms with blades 16 being connected at their approximate mid-point to such arms.

Each of arms 14 comprise a first inner member 22 having first end 24 and second end 26 and a second outer member 28 having first end 30 and second end 32. First end 24 of inner member 22 is secured to a tube 34 rigidly mounted upon shaft 12 by bolts or pins 36. First end 30 of outer member 28 is attached to second end 26 of inner member 22 by integral construction or other conventional means.

Each blade 16 includes a leading edge 38, a trailing edge 40, a first surface 42 and a second surface 44 so as to have an airfoil shape in cross section. The airfoil may be symmetrical or nonsymmetrical. Blades 16 are connected to second end 32 of outer arm member 28 by a connection assembly 46, as seen in FIG. 6. Connection assembly 46 includes a plate 50 which engages surface 44 and is attached thereto by bolts 52 extending through holes in blade 16 or by other convenient means. Plate 50 has a pair of spaced apart ears 54 extending therefrom. Second end 32 of outer arm member 28 is received between the pair of ears 54 and is secured thereto by nut and bolt assembly 56. Nut and bolt assembly 56 permits the disposition of blades 16 with respect to outer arm member 28 to be varied, such that the angle of attack of blades 16 is adjustable.

FIG. 4 shows blade 16 mounted upon arm 14 in the preferred embodiment such that the lifting force, designated by arrow 58, generated on the blade by the movement of air particles over blade surface 42 and 44 exerts a pull on arm 14 to rotate rotor 10. In this preferred arrangement, surface 44 is adjacent ears 54 of connection assembly 46. FIG. 5 shows an alternative embodiment with an "a" added to reference numerals of similar components, wherein surface 42a of blade 16a is adjacent ears 54 such that the lifting force 58a exerts a push against arm 16 to cause rotation of wind rotor 10.

In operation, the movement of air particles past blades 16 generates an aerodynamic lifting force 58 on each of the blades perpendicular to the chord line 60 of the blades. The component of the total lift on each blade acting perpendicular to first inner arm member 22 places torque on the interconnected tube 34 and shaft 12 such that rotor 10 rotates about the longitudinal axis of shaft 12. The direction of rotation is dependent upon the orientation of blades 16 with respect to 14. As seen in FIG. 4, when plate 50 having ear 54 is adjacent second surface 44 of blade 16, the total lifting force 58 is directed outwardly from shaft 12 thereby exerting a pulling force upon arm 14 to cause clockwise rotation of wind rotor 10. In comparison, in FIG. 5 plate 50 with an ear 54 is mounted adjacent first surface 42a of blade 16a such that the resulting total lift 58a exerts a pushing force upon arms 14 to cause counter-clockwise rotation of wind rotor 10.

Wind rotor 10 of the present invention is self-starting. In other words, when sufficient lift forces are applied to blades 16 as a result of air particles moving over blade surfaces 42 and 44, rotation of wind rotor 10 will commense. Thus, a Savonius rotor or other starting mechanism is not required on wind rotor 10.

The angular velocity of blade 16 is independent of the linear velocity of the wind. The angular or circumferential velocity of blade 16 is dependent upon the length of second outer arms 24 of arms 14. The resulting lift forces are dependent upon the airfoil configuration, the angle of attack of the blades, and the angular velocity of the blades. The total torque applied to shaft 12 is dependent upon the length of first inner arm member 22 and the component of total lift perpendicular to member 22.

The chord line 60 of blades 16 is not close to being normal to the longitudinal axis of inner arm members 22, but rather is closer to being in a parallel relationship with the longitudinal axis of member 22 than in a perpendicular relationship thereto. Therefore, a greater portion of the total lift, which is perpendicular to the blade chord line, is utilized in producing torque upon shaft 12. In comparison, prior art wind rotors typically have straight lever arms with blades mounted thereon such that the chord line of the blades are close to being perpendicular to the lever arms. In such prior art devices, a substantial portion of total lift acts parallel to the arm and is therefore useless for providing torque on the central shaft. These prior art devices utilize only the forward component of the total lift, which tends to be small in magnitude. The wind rotor of the present invention, in comparison, utilizes a greater portion of the total lift since the magnitude of that lift which is parallel to the inner arm member 22 is substantially less than in a prior art straight lever arm device.

FIG. 7 shows a wind 62 rotor with a modified arm embodiment. Rotor 62 is substantially similar to rotor 10 previously described and includes a central shaft 64 with a torque tube 66 secured thereto. Lever arms 68 are attached to tube 66 and stabilized by brace 70. Arms 68 each are comprised of an inner member 72 and a pair of oppositely disposed outer members 74 and 76. Rectilinear airfoil blades 78 and 80 are attached to members 74 and 76, respectively, by mounting assemblies 82, so as to exert a torque on shaft 62. Blades 78 are connected to arm members 74 such that the aerodynamic lift on the blade resulting from the movement of air particles over the blade surfaces is directed away from arms 68. Blades 80 are connected to arm members 76 such that the aerodynamic lift on the blade is directed toward arms 68. Thus, blades 78 and 80 cooperate to exert a pulling force and a pushing force, respectively, on inner arm members 72 thereby producing torque on shaft 64 for the rotation of rotor 62.

It is understood that the embodiments of the wind rotor shown and described herein can be modified without departing from the scope of the present invention. Particularly, the angular disposition and relative lengths of the inner and outer arm members with respect to one another may be varied as demanded by design criteria. Also, any number of arms may be utilized on the central shaft. Furthermore, mechanical, electrical, hydraulic, or pneumatic control means can be supplied to control the angle of attack and the angular velocity of the blades so as to improve the efficiency of the wind rotor in various environmental conditions. Aerodynamic controls, such as flaps and spoilers on the blades, can also be provided for additional control of the wind rotor.

From the foregoing, it can be seen that the bent arm wind rotor of the present invention effectively captures the potential energy of the wind and accomplishes at least all of the stated objectives.

What is claimed is:

1. A wind rotor for use with an electrical generator, comprising:
   an elongated vertically disposed, rotatable shaft operatively connected to said generator;
   a plurality of horizontally disposed and uniformly spaced inner arm members having a first end attached to said shaft and a second end extending radially outwardly therefrom;

a plurality of horizontally disposed outer arm members each being secured to said second end of one of said inner arm members and being angularly disposed with respect to said one inner arm member;

a plurality of vertically disposed airfoil blades each having a leading edge, a trailing edge, and opposite first and second surfaces and each blade being connected to one of said outer arm members such that the chord line thereof is substantially parallel to the longitudinal axis of the respective inner arm member to which the outer arm member is attached, whereby the movement of a compressible gaseous fluid with respect to said blades generates aerodynamic lifting forces on said blades thereby rotating said rotor; and connection means for securing said blades to said outer arm members.

2. The rotor of claim 1 wherein each of said blades is a rectilinear airfoil.

3. The rotor of claim 2 wherein said airfoil is nonsymmetrical.

4. The rotor of claim 1 wherein said connection means is adjustable whereby the angle of attack of said blades with respect to said fluid is selectively adjustable.

5. The rotor of claim 1 wherein said connection means are connected to said first surface of said blades whereby said lifting forces pull on said inner arm members to rotate said rotor.

6. The rotor of claim 1 wherein said connection means are connected to said second surface of said blades whereby said lifting forces push on said inner arm members to rotate said rotor.

7. The rotor of claim 1 wherein each of said outer arm members has first and second opposite ends, said first end of said outer arm members being connected to said second end of said inner arm members.

8. The rotor of claim 1 wherein each of said outer arm members has first and second opposite ends, said outer arm members being connected intermediate said ends thereof to said second end of said inner arm members.

9. The rotor of claim 8 wherein the angles between each end of said outer arm member and said inner arm member are identical.

10. The rotor of claim 8 wherein said first surface of one of said blades is secured to said connection means at said first end of said outer arm member and said second surface of another of said blades is secured to said connection means at said second end of said outer arm member whereby said lifting forces act in opposite directions on said one blade and said another blade thereby exerting pulling and pushing forces, respectively, on said inner arm member to rotate said rotor.

* * * * *